United States Patent [19]

Bhatia et al.

[11] Patent Number: 4,513,674
[45] Date of Patent: Apr. 30, 1985

[54] MECHANISM GENERATING ELLIPTICAL MOTION

[75] Inventors: Chandrakant Bhatia, Buffalo Grove; George M. Toman, Chicago; Thomas J. Bock, Schaumburg, all of Ill.

[73] Assignee: Union Special Corporation, Chicago, Ill.

[21] Appl. No.: 329,796

[22] Filed: Dec. 11, 1981

Related U.S. Application Data

[62] Division of Ser. No. 904,204, May 9, 1978, Pat. No. 4,344,376.

[51] Int. Cl.³ .................. D05B 57/30; F16H 37/12
[52] U.S. Cl. .................................. 112/220; 74/52; 112/200
[58] Field of Search .......... 242/1.1 A; 74/52; 112/199, 200, 201, 220, 221, 55

[56] References Cited

U.S. PATENT DOCUMENTS

| | | | |
|---|---|---|---|
| 2,256,094 | 9/1941 | Lynch | 74/52 X |
| 2,676,799 | 4/1954 | Fletcher | 74/52 X |
| 3,318,274 | 5/1967 | Schoij | 112/248 |
| 4,022,140 | 5/1977 | Lienemann | 112/199 |
| 4,362,113 | 12/1982 | Bock et al. | 112/199 |
| 4,374,502 | 2/1983 | Toman et al. | 112/199 X |

OTHER PUBLICATIONS

Product Engineering, 9/28/59, pp. 66, 67.
Ishida et al., The American Society of Mechanical Engineers, 9/77, pp. 1 through 9.

Primary Examiner—Wm. Carter Reynolds
Attorney, Agent, or Firm—John W. Harbst; John A. Schaerli

[57] ABSTRACT

A Cardan gear assembly wherein rotary input motion of the main shaft is converted to elliptical output at the Cardan gear output centerpoint. The Cardan gear output centerpoint is connected via a ball and a pin slideable therethrough to a support having a work performing instrumentality arranged at its distal end. During operation, the elliptical output motion of the Cardan gear output centerpoint is transmuted into three dimensional, elliptical like motion at the tip of the work performing instrumentality.

7 Claims, 17 Drawing Figures

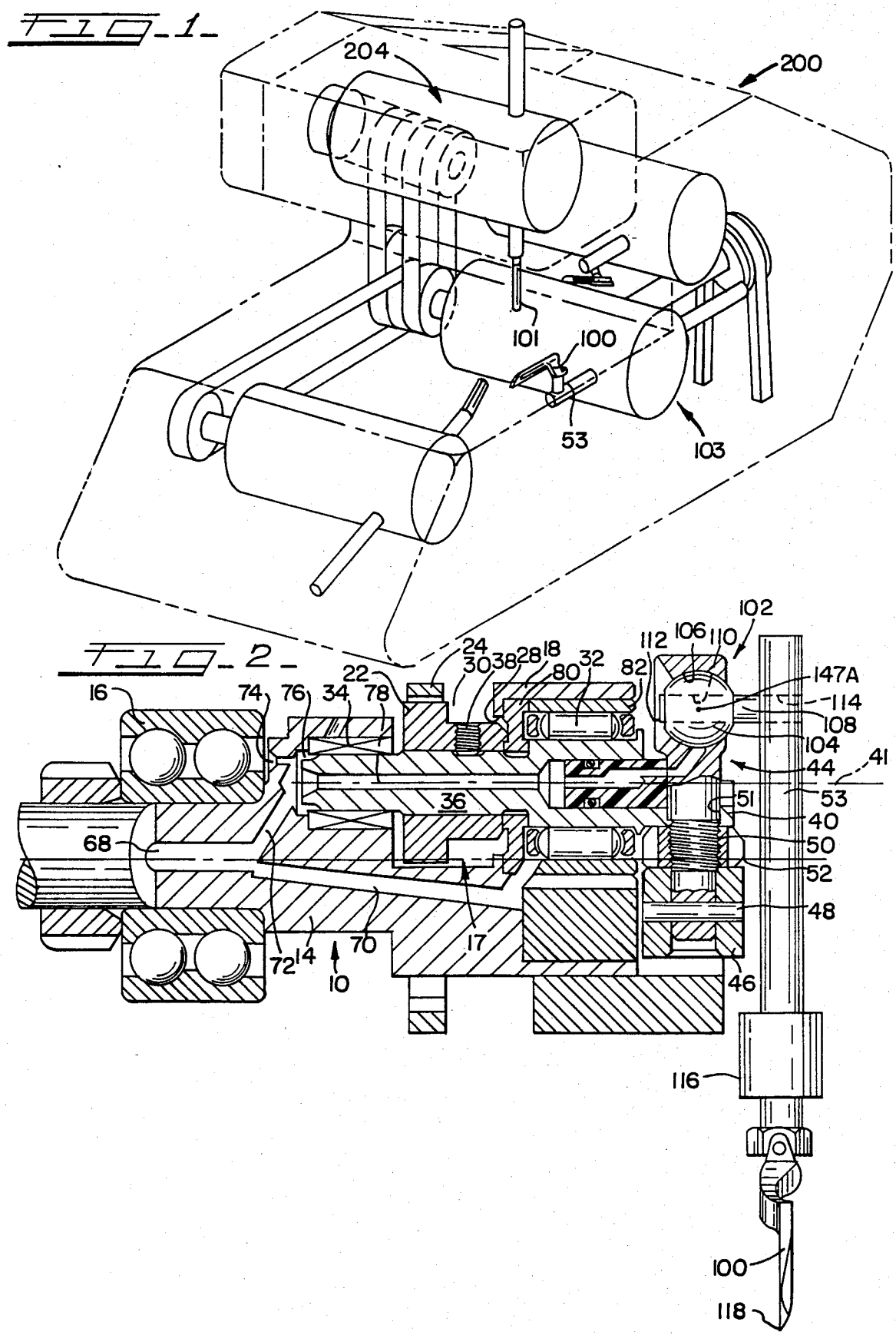

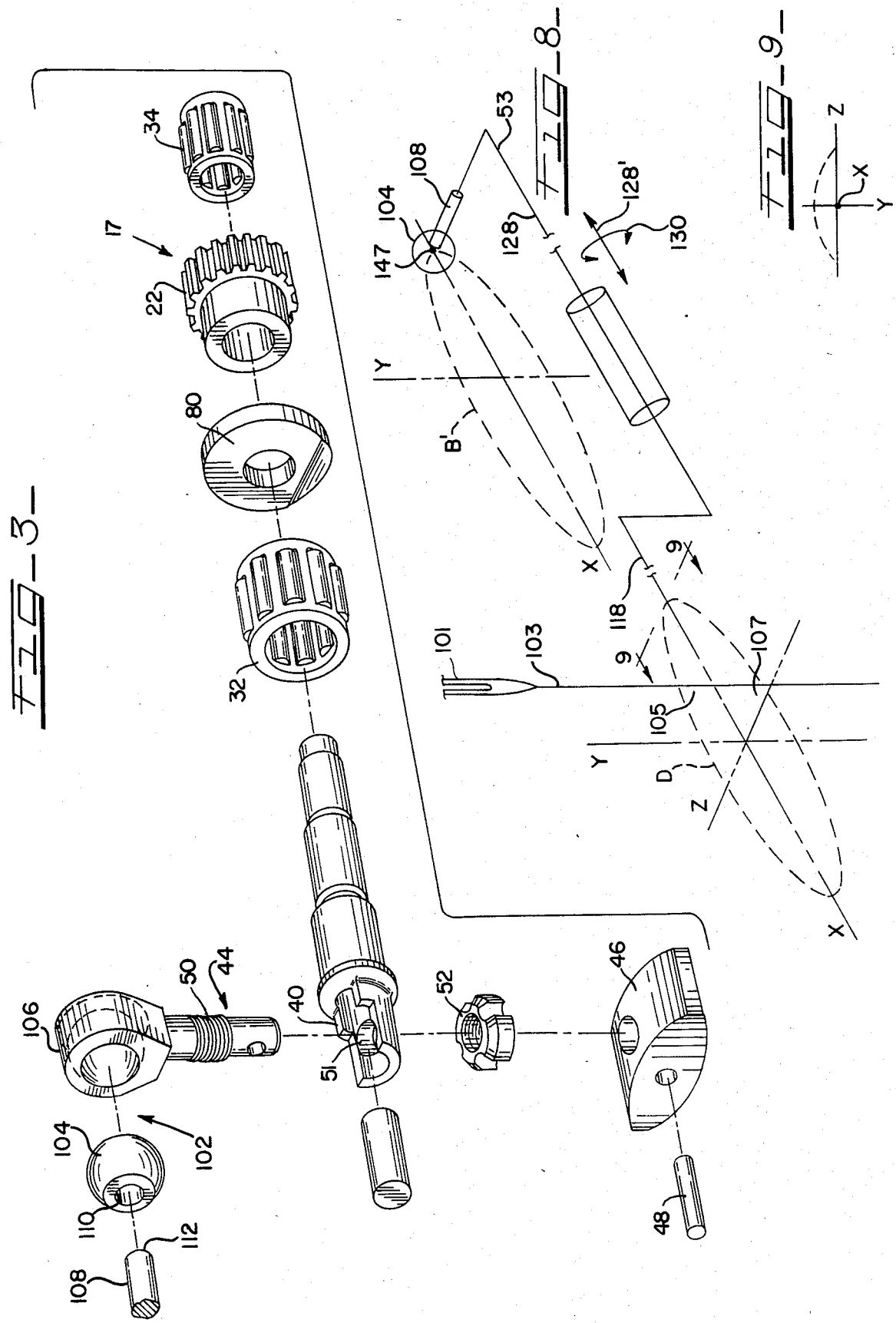

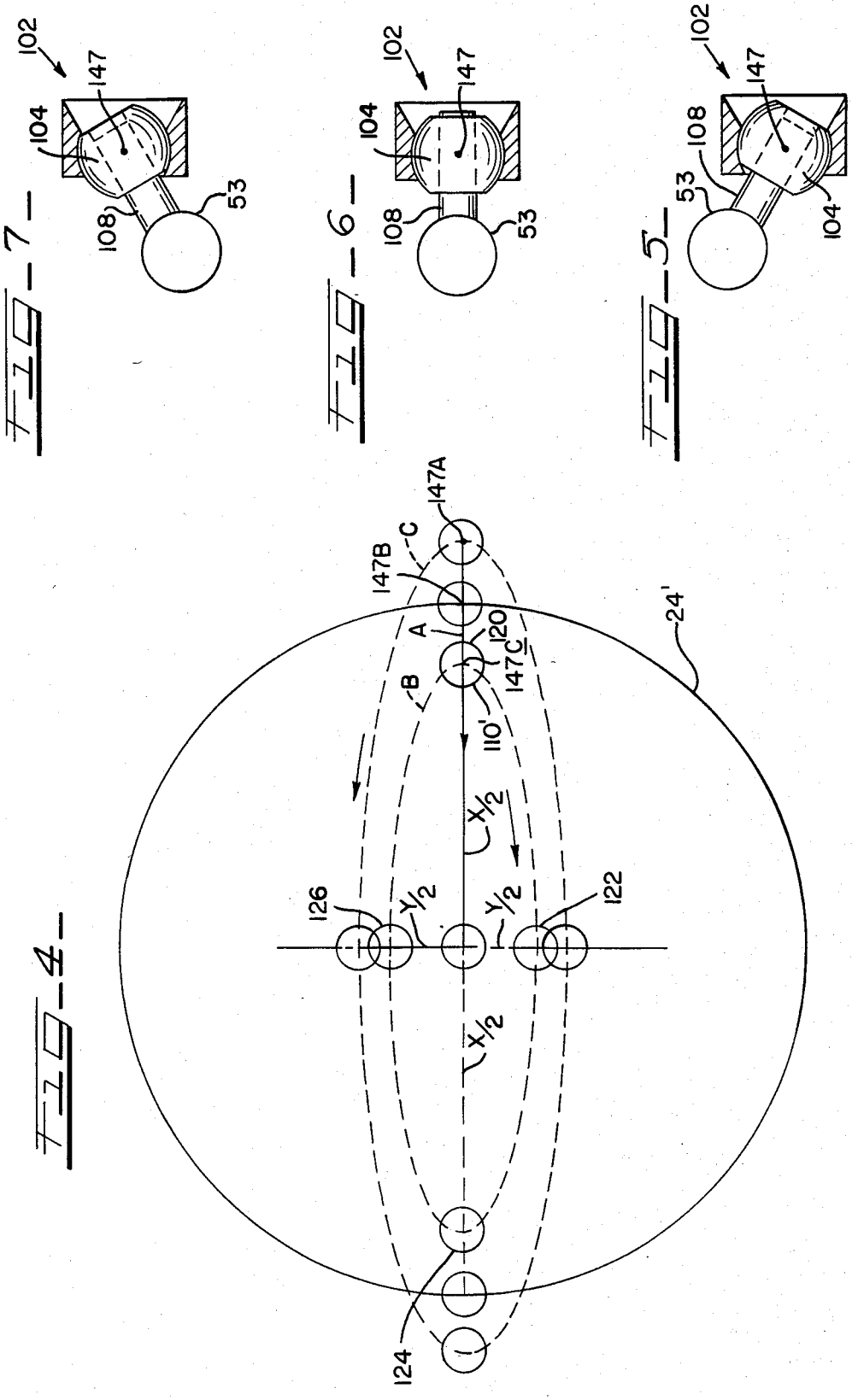

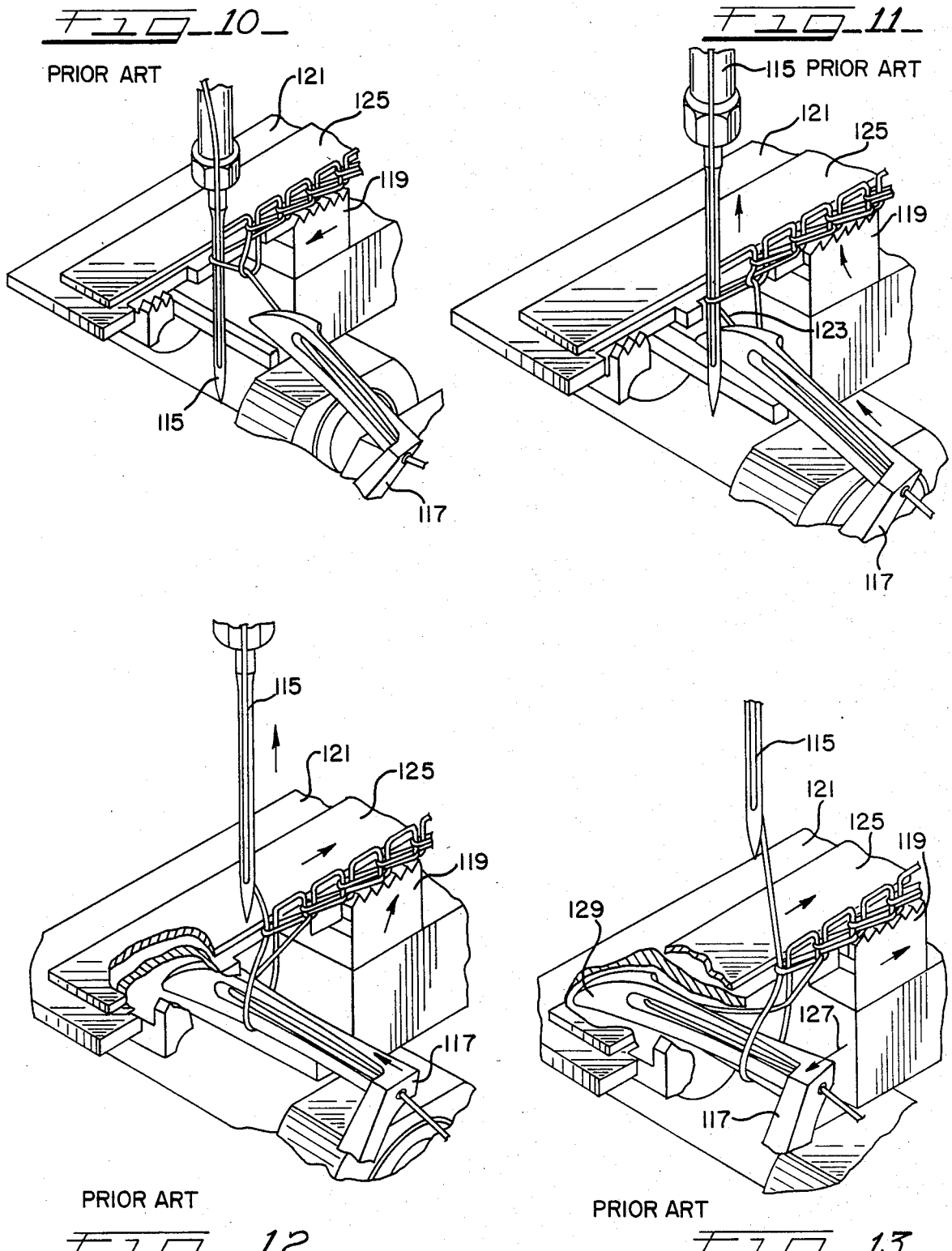

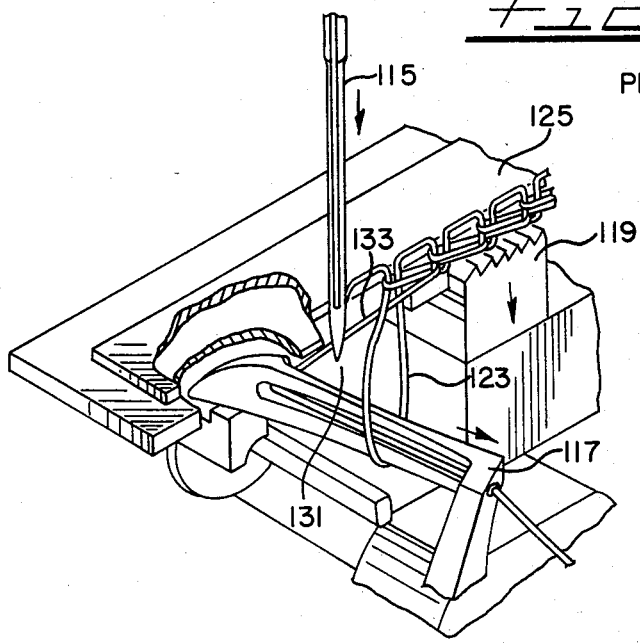
FIG_14_
PRIOR ART
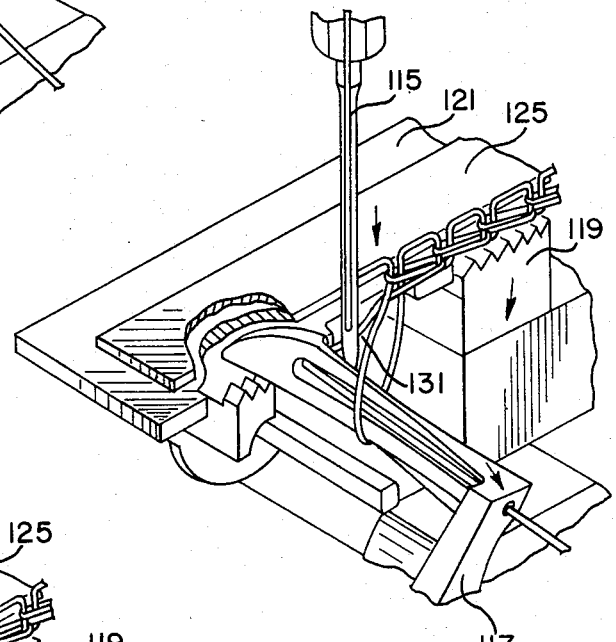
FIG_15_
PRIOR ART
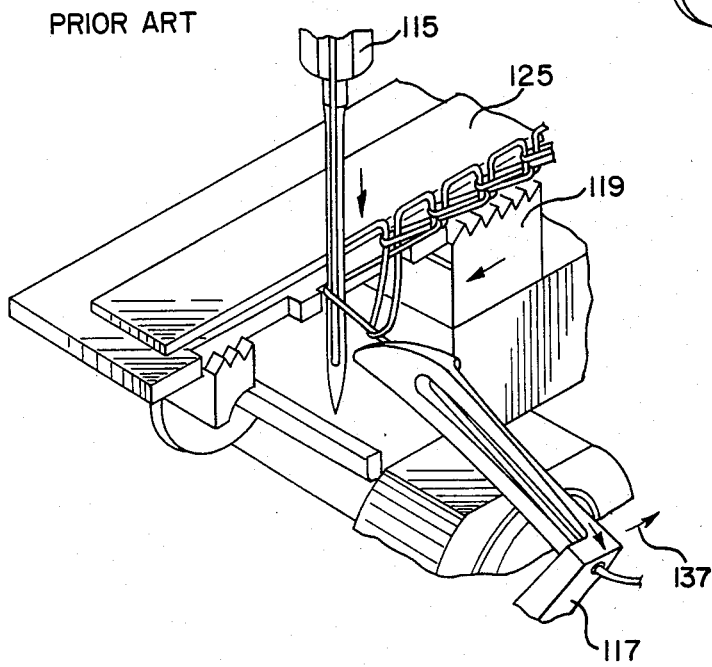
FIG_16_
PRIOR ART

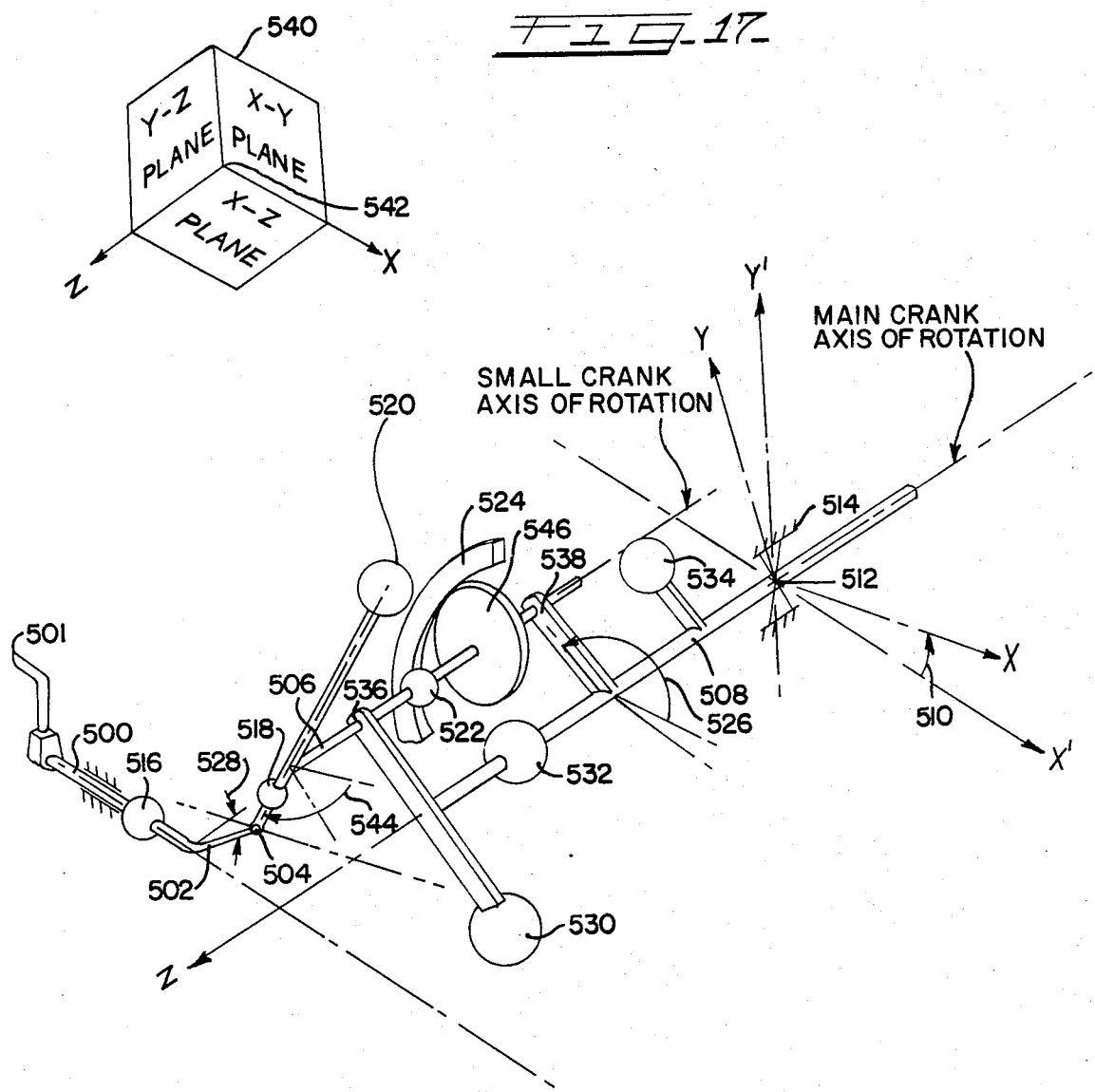

MECHANISM GENERATING ELLIPTICAL MOTION

This is a divisional of application Ser. No. 904,204, filed May 9, 1978, now U.S. Pat. No. 4,344,376.

This invention relates to an apparatus for moving a work performing means through a reciprocating harmonic ellitical-like work cycle and a means to balance all inertial forces and moments for this motion. It is particularly concerned with a looper drive mechanism for use in sewing machines capable of producing 400 Class stitches.

The formation of a 400 Class stitch is well known wherein the needle and the looper mechanism cooperate in a predetermined manner to form the stitch. For information on the formation and types of 400 Class stitches reference, for example, can be made to "Stitch Formation Type 401" published by the Union Special Corporation, 400 North Franklin Street, Chicago, Ill. 60610, and the Federal Standard Stitches, Seams, and Stitchings (Fed. Std. No. 751a, Jan. 25, 1965).

The type 401 stitch formation is shown in FIGS. 10 through 16. Referring first to FIG. 10, the needle means 115 is shown at the bottom of its stroke. The looper means 117 is at its extreme position to the right of the needle means. The feed dog means 119 is approximately at its lowest position and is moving forwardly generally beneath the throat plate means 121. Referring now to FIG. 11, the needle means 115 is shown rising with the formation of a needle thread loop 123 on the back side thereof. The looper means 117 is moving to the left and has entered the needle thread loop 123. The feed dog means 119 is rising upwardly from below the throat plate means 121. Referring now to FIG. 12, the needle means 115 is shown to be still rising. The looper means 117 is still continuing to move to the left. The feed dog means 119 has risen above the throat plate means 121 and is moving to feed the fabric means 125 to the rear. Referring now to FIG. 13, the needle means 115 is at the top of its stroke. The looper means 117 has reached its extreme position to the left and is going through the "Avoiding" portion of the cycle. The "avoiding" motion takes place when the looper means 117 moves generally in the direction represented by arrow 127. As is appreciated, the tip means 129 can be said to have moved through the first portion of an ellipse. Thus the path followed on the outward portion of the stroke will be different than that along the return portion. This different path is determined by the amount of avoid. Referring now to FIG. 14, the needle means 115 is now descending. The looper means 117 has avoided and is moving generally to the right and is beginning to withdraw from the needle thread loop 123. The shape of the looper blade 117, the avoid action of the looper means 117, the action of the feed dogs 119 and the various thread handling components all assist in the formation of the window or triangle means 131. The triangle means 131 is formed by the looper thread 133, the needle thread loop 123 and the back side of the looper means 117. In FIGS. 10 through 14 the feed dog means 119 has moved the fabric means 125 one stitch length and is beginning to descend in preparation of the next cycle. Turning now to FIG. 15, the needle means 115 has entered both the fabric and the triangle 131. The looper means 117 is still moving to the right. The feed dog means 119 is now below the throat plate means 121 and is beginning to move forwardly again. In FIG. 16 the needle is practically at its lowest position near the bottom of its stroke. The looper means is still moving to the right and is just beginning to avoid in the direction shown by arrow 137. This avoid motion will bring it back to its initial position as shown in FIG. 10. The feed dog is almost at its lowest position and is preparing for the beginning of the next cycle.

If only the tip portion 129 of the looper 117 (FIG. 3) is considered with respect to the needle means 115 it is apparent that it circumscribes a generally elliptical like curve thereabout. The avoid motion determines the minor axis of the curve and the stroke of the looper means 117 determines the major axis. All of these maneuvers are designed primarily to open up the triangle 131.

In a machine producing a double locked stitch, commonly known as a 401 stitch, and variations thereof, it is required that a thread carrying device, known as a looper, cooperate in synchronism with a needle to form the desired stitch. Looper devices, driven from the bottom bed of the machine, commonly reciprocate along an axis perpendicular to that of the needle bar motion either in the feed direction of the machine or across the line of feed of the machine. For looper across the line of feed machines, which are most common, it is also required that the looper motion move from the rear side of the needle to the front side of the needle during its reciprocating stroke in order to permit the needle to enter the triangle. Thus in essence, the looper in conventional machines reciprocates in a somewhat modified elliptical manner in a plane perpendicular to that of the needle bar. As is appreciated the modified elliptical curve lies in the X, Y and Z dimensions with its major axis in the X, Y plane.

In order to obtain this compounded motion, two separate kinematic motions are usually combined in order to provide the desired looper path. These motions are traditionally provided by separate cranks or eccentrics connected to a main rotary shaft. One of these motions provides reciprocating axial motion of the looper and the other serves to rock the looper to provide the avoid motion about the needle. Such mechanisms consist of compounded linkages, connecting rods, straps and the like which are all sources of noise, wear vibration and overthrow. In addition such devices possess large unbalanced inertia forces and moments which are a source of high noise and vibration. This is especially true as machine speeds increase to the order of 6000 RPM and above.

Consequently it is highly desirable to provide a mechanism in which essentially elliptical reciprocating motion is obtained from a single crank means and in which inertia forces and moments are balanced. The mechanism thus, permitting high speed operation at low noise and vibration levels without detrimental effects on bearing life. Oblique crank devices have been used for such purpose in which the oblique crank is embraced by a sleeve which has a swinging bar whose axis lies perpendicular to the crank and runs perpendicularly to the said looper carrier.

Oblique crank devices, while possessing many advantages to the separately driven looper and looper rocker mechanisms are difficult to utilize practically due to interference with feed mechanisms and in many cases are utilized in machines with cantilevered feed drives. In machines requiring a small cylinder diameter on the bottom bed to handle tubular materials it is quite difficult to geometrically configure the oblique crank looper mechanisms and feed mechanisms without increase of the diameter of the cylinder above desired values. In addition oblique crank devices also are subject to unbalanced inertia forces and moments.

Another device, Cardan gear mechanisms, have been employed in industrial sewing machines to drive a needle bar along a straight line path. Yet due to various difficulties, Cardan gear driven needle bars in industrial sewing machines are not commercially available. A major problem involves the balancing of the mechanism to achieve an acceptable life, low noise and minimal vibration. As will be appreciated the forces generated by a needle bar are along a straight line and act directly off the output pinion of the Cardan gear mechanism.

A Cardan gear mechanism for driving a Class 400 stitch looper would offer very substantial advantages over standard mechanisms just as it does for driving a needle bar, for example see copending application Ser. No. 908,199, filed May 22, 1978. A looper in order to produce a 400 Class stitch, optimumly has its tip driven along a generally ellipse like path. That is, along and around the major axis of the looper bar rather than as with the needle bar which is moved simply along its major axis. However, it has been found to be not mechanically practical to drive the looper mechanism directly off the output lever of the pinion shaft. Thus a force transfer means is interceded between the looper bar and the pinion means. Both of these factors, ellipse like motion and the force transfer means, create additional balancing problems above and beyond those present in a needle bar driven by a Cardan gear. For example, see U.S. patent application Ser. No. 386,366, filed June 8, 1982.

The invention as hereafter disclosed employs a balancing technique to a cantilevered Cardan gear mechanism in conjunction with certain mechanical elements to drive a work performing means or looper through an ellipse like curve. In contract to prior art devices, a minimum number of moving parts are employed and a simple mode of adjustment of the resultant ellipse like curve is possible. In practice, the output centerpoint of the Cardan gear drive mechanism is moved off the pitch diameter of the ring gear. As a result the output centerpoint will be swept through an elliptical curve. A force transfer means connects the output centerpoint to a looper bar which is fixed with respect to the Cardan gear mechanism by a bearing means. Due to this particular arrangement the looper bar is capable of movement along its major axis while also being simultaneously moved around its major axis. The tip of the looper means, which is fixedly secured to the looper bar, thus sweeps out an ellipse like curve which cooperates with the needle to form the desired stitch. The minor axis of the ellipse like curve is a measure of the needed "avoid" motion desirable in the formation of the stitch. The ellipse like curve herein developed is based on a straight line reciprocating action, whereas the motion of looper 117 discussed in prior art FIGS. 10–16 is generated by rotation around a centerpoint, thus it lies along a segment of the diameter of a circle.

It is therefore an object of the present invention to provide a new looper drive mechanism. It is still another object of this invention to provide a looper drive mechanism wherein the major and minor axis of the ellipse like curve swept out by the tip of the looper can be easily varied. But another object of this invention is to provide a looper mechanism suitable for forming a 400 Class stitch, in cooperation with a needle means, and being driven by a balanced Cardan gear mechanism. It is another object of this invention to provide a looper driven through an elliptical path by a Cardan gear mechanism wherein a force transfer means connects the output pinion to the looper bar. But another object of this invention is to provide a balanced Cardan gear means for driving a work performing means through an ellipse like curve.

Other features and advantages will appear from the detailed description of a preferred embodiment of the same which will now be given in conjunction with the accompanying drawings in which:

FIG. 1 is a partial isometric view of a sewing machine wherein the looper and related stitch forming elements are driven by Cardan gear type modules.

FIG. 2 is a partial view in horizontal section of the looper drive Cardan gear module and looper assembly.

FIG. 3 is an exploded isometric view of the elements carried by and including the double speed bearings.

FIG. 4 is a diagrammatic view showing the path of movement of the center of the output pin as it is positioned at different points with respect to the ring gear.

FIGS. 5, 6 and 7 are partial views showing the relationship of the output assembly and the looper bar at different points of the work cycle.

FIG. 8 is a diagrammatic view showing the path swept out by the center of the output pin and the corresponding path swept out by the tip of the looper.

FIG. 9 is a view taken along the line 9—9 of FIG. 8.

FIGS. 10–16 are partial views showing a prior art method of the formation of a Class 401 type stitch.

FIG. 17 is a model representation showing the various factors acting upon the system during a work cycle.

Referring now to the above mentioned drawings and particularly to FIG. 1 which shows features of the present invention applied to a stylized sewing machine 200. A series of Cardan gear modules are employed to drive the elements which cooperate to form, for example, a 401 stitch. These elements include a lower looper Cardan gear module 103 and a needle Cardan gear module 204. The needle means 101 cooperates with the looper means 100 in a well known manner to form the standard type 401 stitch.

As shown in FIG. 2 the Cardan gear means 10 which is part of Cardan gear assembly means 103 includes an enlarged extension or frame means 18 of rotationally driven shaft 14 supported in cantilever fashion from bearing 16. As shown, this frame means 18 is shaped to receive a pinion gear assembly 17 as shown in FIG. 2 and 3. The extension 18 is provided with a horizontally extending aperture or cavity 28, as well as a cutaway portion 30. As is apparent, the cutaway portion facilitates the engagement of the pinion gear means 22 with the internal ring gear 24. The aperture means 28 carries the double speed bearing means which includes first and second bearing sets 32 and 34 which journal the pinion shaft means 36. The set screw 38 is employed to secure the pinion gear 22 to the pinion shaft 36. Secured to the left end 40 of the pinion shaft 36 is a pinion output lever or connecting means 44 which connects the work performing instrumentality 53 thereto such that overall a cantilevered system is created. The lever means 44 also connects to the pinion shaft 36 a mass 46 which exerts force on said shaft whereby when balanced around line 41 there would be a zero load vector exerted on the double speed bearing means. In the preferred embodiment the mass exerting the force is a counterweight means 46 which is secured to lever means 44 with a pin means 48. The lever means 44 is provided with a threaded portion 50 designed for engagement with a spanner nut 52. In the preferred embodiment, the lever means is inserted through the aperture means 51 in the shaft means 36 and the spanner nut 52 securely locks the elements in a predetermined position.

The work performing device 53, in the preferred embodiment, is a reciprocatory looper bar held in position by bearing set means 116. As is apparent, the looper bar 53 is secured for reciprocatory movement by the bearing.

The bearing sets hereunder discussion, that is, the main bearing set 16, the double speed bearing sets 32 and 34, and the force transfer means 102 are all provided with a positive oiling system. Oil enters main channel means 68 under pressure and thereafter passes via auxiliary channeling to each of the respective bearing sets. Bearing set 32 received oil via channel means 70, bearing set 16 via channel means 72 and 74, bearing set means 34 via 72 and 76 and force transfer means 102 via channel means 72 and 78. Any suitable oil pumping system can be employed as is presently employed in conjunction with industrial sewing machines.

The pinion shaft 36 is secured in place by the provision of a thrust washer 80. A combination of the outer race 82 of the bearing set 32 on one side and the frame means 18 on the other secure thrust washer 80. In the preferred embodiment the thrust washer 80 is a material manufactured by the DuPont Corporation under the trade name "Vespel". The thrust washer 80 provides a substantially friction free abutting surface for the pinion gear 22 whereby the pinion shaft and related assemblies are fixed with regard to the frame assembly.

The invention hereunder consideration is the means for driving the tip 118 of the looper means 100 through an elliptical like curve or a curve in three dimensions. As shown in FIG. 2 the lever means 44 is connected to the work performing means 53 via a force transfer means 102. The force transfer means 102 in the preferred embodiment includes a ball means 104, a socket means 106 carrying the ball and a pin means 108. The pin or lever means 108 is freely carried within aperture 110 whereby the pin 108 is free to move in at least three different degrees of freedom. For a complete discussion of the force transfer means 102 reference should be made to copending application Ser. No. 386,366 filed June 8, 1982. As is apparent, the force transfer means 102 converts elliptical two-dimensional motion into elliptical-like three dimensional motion.

The first end 112 of the pin 108 is free to float within aperture 110. The second end 114 being fixedly secured to the work performing means 53. In the preferred embodiment the work performing means is a looper bar carrying the looper means 100 at an end thereof. A bearing means 116 constrains the looper bar 53 in a predetermined position with respect to the Cardan gear module.

It is well understood that the output of a Cardan gear assembly, such as that shown in FIG. 2, can be modified such that a point at the center of the ball means 104 does not sweep out a straight line. In the description of the invention hereunder consideration this point is called the output centerpoint means 147.

For the sake of clarification reference should now be made to FIG. 4 wherein is shown a partial schematic representation of the front of a Cardan gear assembly showing the path swept out by the output centerpoint means 147 of the ball 104. The pitch diameter of the internal ring gear 24 is represented by the circle 24'. The circle 110' represents the aperture 110 in the ball means 104. The straight line path A shows the path of the ball means 104 when the output centerpoint 147 lies on the pitch diameter of the internal ring gear 24 as represented by point 147B. This is the standard position wherein a Cardan gear mechanism converts rotary input to straight line output. By shortening or lengthening the lever means 44 through adjustment of the spanner nut 52 the output centerpoint means 147 can be moved either inside or outside of the pitch diameter of the ring gear 24. The ellipses B and C represent the corresponding output. That is by simply moving the output centerpoint 147 outside or inside of the pitch diameter of the ring gear 24, represented by points 147A and 147C, respectively, an ellipse can be swept out. This ellipse is in the X, Y plane, i.e., the plane of the paper. It is noted that the ellipse will be generated in different directions depending on whether the output centerpoint 147 is inside or outside of the pitch diameter of the ring gear 24. As is apparent the farther out or the farther in from the ring gear 24 the greater will become the amplitude or Y axis of the ellipse. Correspondingly the stroke of the looper bar will become less as the output centerpoint 147 moves within the ring gear 24 and greater when the centerpoint moves out beyond the ring gear 24. In either case the minor Y axis becomes greater than when the output center point 147 lies on the pitch diameter of the ring gear 24.

Referring now to FIGS. 5 through 9 the mode whereby the elliptical motion of the output centerpoint is employed to generate elliptical like motion at the leading working section means 118 of the working performing instrumentally will be discussed. Additionally the premise will be made that the output centerpoint 147 will follow the ellipse identified as B. At the starting point the ball 104, the rod or slider pin 108 and the looper bar 53 occupies the positions shown in FIG. 6. It must be remembered that the rod is fixed to the looper bar 53 which is itself fixed with respect to the Cardan gear means 10 by the bearing means 116 the latter being fixed to the frame the Cardan gear module. The bar 53 is thus capable of only rotational and reciprocatory movement along a straight line path. The reciprocatory movement being along its major axis and the rotational movement being around its major axis. Beginning with the position shown in FIG. 6 which corresponds to 120 in FIG. 4 the force transfer means 102 moves to the position represented by 122 during the first quarter of the cycle. In position 122 the relationship of the looper bar 53, the rod 108 and the force transfer means 102 move to the position shown in FIG. 5. A reciprocating motion corresponding to the distance X/2 and a rotational movement which is a factor of the distance Y/2 has thus been imparted to the looper bar 53, the X and Y being the major and minor axes of the ellipse identified as B. The reciprocatory motion is quite straightforward while the rotational movement occurs as the ball 104 moves above the straight line swept out by the looper bar a maximum distance of Y/2. This is possible because the rod 108 can slide freely into and out of ball 104 within aperture 110. At point 124 the force transfer means 102 and the looper bar 53 have moved back to the position shown in FIG. 6 while at position 126 they are in the position shown in FIG. 7. The looper bar 53 is thus passed through a reciprocation corresponding to distance X while it is rotated through an angle which is a factor of the distance Y.

It should, however, be understood that, while the minor axis in curve B' in FIG. 8 is in the Y, X plane, in curve D the minor axis is generally in the X, Z plane. In both curves the major axis will be in the X, Y plane. Depending on the geometric orientation between the looper 100 and looper bar 53 the minor axis can be adjusted to lie in any combination of Y and Z planes over 360 degrees. That is, both the rod 108 and looper 100 are secured, in the preferred embodiment, to the looper bar 53. A phase angle thus exists between the major axis with reference to that of the looper bar 53 and by varying this phase angle the output curve of looper tip 118 can be made to be in many various planes.

Bearing these factors in mind we now turn to FIGS. 8 and 9. The ellipse like curve swept out by the output centerpoint 147 of the ball 104 is represented by B'. The looper bar 53 is constrained from any other movement other than reciprocation along its major axis 128 as shown by arrow 128', or rotation around its major axis, arrow 130. For the sake of explanation let it be stated that the major and minor axes of curve B' lie within the plane of the paper with the major axis of the looper bar 53 being parallel and spaced therefrom. Let it also be stated that the major axis of curve D lies within a plane which is parallel with the plane of the paper but spaced therefrom, while the curve also lies in the Y and Z dimensions as well. The looper 100 since it is fixedly secured to looper shaft 53 follows both the reciprocative as well as rotational movement thereof. Thus the tip 118 of the looper 100 sweeps out an ellipse like curve as represented by D. An end view of ellipse like curve D being shown in FIG. 9. Beginning with a curve B' in the X major and Y minor planes a curve D is generated which lies in three dimensions. This ellipse like curve represents the necessary path that the looper tip 118 must sweep out in cooperation with the needle 101 to form the desired 401 type stitch.

It should be appreciated that the arrangement of elements shown in FIG. 2 will result in the output centerpoint 147 sweeping out a curve corresponding to "C" in FIG. 4. That is the centerpoint 147 is located outside of the pitch diameter of the ring gear.

The line 103 as shown in FIG. 8 represents the general path taken by the needle 101 during the formation of the 401 stitch. The area 105 is representation of where the tip 118 of the looper 100 enters the needle thread loop created on the back side of the needle 101 as shown in FIG. 11. The area 107 is the point where the needle 101 enters the triangle formed on the back side of the looper in cooperation with the fabric as shown in FIG. 15.

The length of the major axis of the ellipse D will correspond somewhat in length to that of the ellipse which is swept out by the output centerpoint 147 of the output ball 104. The length of the minor axis of the ellipse like curve D will depend on a number of factors. For example, the distance which the output centerpoint 147 is from the pitch diameter 24' of the ring gear 24, the length of the rod 108 and the length of the looper support arm. These different parameters can be jointly or singly varied such that for a given major axis of curve D the minor axis can be made larger or smaller by the phase angle determining the plane relationships. Any number of adjustable securing means can be employed such as a lock screw, clamp, etc.

It can be said that the elliptical curve B is the summation of two straight line motions which are 90° out of phase. The same can be said for all of the elliptical curves swept out by the output centerpoint 147 of the ball means 104.

Balancing of the Cardan gear module means has been pursued with the intent of either minimizing or at best eliminating the effects of inertia forces on the operating quality of the system. It has been found that the degree to which the unresolved inertia forces can be minimized or eliminated will depend upon the particular path through which the work performing means is being driven. If the inertia forces in the system were not resolved their presence could result in fluctuating and reversing loads which in turn could produce increased stress in members, and impacts between loosely fitted elements. The result being higher noise levels and wear and reduced fatigue life of the loaded elements.

Balancing of the system may be approached from two different directions. The first approach is on a theoretical level which attempts to predict the state of the unresolved inertia forces and develop their solutions prior to actual manufacture of the component parts. A second method utilizes actual parts and analyzes their unresolved inertia forces due to manufacturing tolerances, for example, by using a balancing machine. This second method as is apparent is well known in the art and therefore no further discussion will be made thereto.

By employing the theoretical approach a theoretical model of a Cardan gear means can be developed. In this particular model through an understanding of the unresolved inertia forces it is possible to make intelligent selection of bearings and the selection and assignment of materials to obtain reasonable stress levels. Additionally, it is possible to proportion the mass of the various elements in order to resolve the inertia forces. The first step in developing the theoretical model is to establish the mode of operation and the function of the Cardan gear system. Specifically, the Cardan gear means operates in a dynamic mode and is capable of driving an output element or work performing means along several different paths of motion. For example, various paths being straight line, helical, ellipse like or a combination of helical and elliptical.

Thus prior to actual design the motion of the work performing means is fixed or decided upon. The geometric relationship of the Cardan gear elements is thus established. To facilitate the development of the mathematical model several assumptions are made about the physical properties of the system under consideration. First, all elements of the mechanism are considered rigid bodies. The effects of deflection are assumed negligible as to their effects on inertial balancing. Secondly, the natural frequency of all the elements is considered to be above the normal operating frequency of the Cardan gear mechanism. Thirdly, the mass of the various mechanical components are lumped. Thus the dynamic analysis of only a few discrete points need be conducted. The lumping, of course, consists of concentrating all of the elements massed at the center of gravity thereof. Lastly the main crank or drive shaft input angular velocity is held constant.

The components or elements which comprise the Cardan gear means are broken down into their basic groups. The dynamic inertia forces of the most basic group is then analyzed. These forces are then superimposed in the second basic group and that group is balanced. The resulting forces are then superimposed upon the third basic group which is ultimately balanced. As shown in FIG. 17 the first basic group includes the looper bar means 500 and everything carried thereby as well as the slider pin portion 502 of the force transfer means 504 which is secured to the looper bar means. The second basic group includes the small crank or pinion shaft 506 and everything carried thereby. The third basic group encompasses the main crank or main drive shaft 508 and all elements carried thereby. In each of these basic groups the masses are lumped in such a manner as to retain the same inertial properties as the actual group. All of this results in a simplified theoretical model of a Cardan mechanism in which a few lumped masses with a specific positional relationship to each other represent the actual mechanism.

Referring to FIG. 17 two spatial right hand coordinate systems have been established for specifying the relationships of the basic components to each other. The global coordinate system defined in terms of X' and Y', which has the looper bar or output bar 500 orientated with respect to it. The main drive shaft 508 and the pinion shaft 506, however, are orientated with respect to a local coordinate system. The local coordinate system (defined in terms of X, Y and Z) lies directly on the global coordinate system and can rotate about one common axis which in practice is Z. This common Z axis as will be noted is also the axis of rotation of the main drive shaft 508. As is appreciated in order to drive the tip of the work performing means 501 through certain motions such as, for example, helical or helical/elliptical, it is required that the local system be rotated (skewed) with respect to the global system. The angle 510 represents the amount of skew. This entails using a coordinate transformation to go from one system to another. Both coordinate systems are fixed and do not move in any way with respect to any of the Cardan gear elements as they travel through a work cycle. Both the global and local coordinate systems have their origin at the center 512 of the main bearing means 514. The planes of interest wherein various basic components operate, are defined by two axes of a given coordinate system.

With the theoretical model decided upon, the mathematical equations defining the kinematic properties thereof may be developed. Since the inertial forces of the looper bar means 500 and other components in the first basic group cannot be easily balanced within themselves the load is transferred to the pinion shaft 506. The point of lumped mass thereof being represented at 516. The pinion shaft as shown in FIG. 17 is represented by three lumped masses 518, 520 and 522 and three points of force ineraction. These points of force interaction corresponding to the two double speed bearing means 536 and 538 and the force transfer means 504. The looper bar means 500 inertia load is transferred through one point of force interraction, i.e., the force transfer means 504 and the two double speed bearing means simulate the support for the pinion shaft or small crank 506. The ring gear 524 is not considered a point of force interaction in the kinematic analysis and only serves as a goemetric constrain for pinion shaft 506. Because the pinion shaft 506 is restrained in a cantilevered fashion and also because of space limitations, it is not easy to balance off the unresolved inertia forces in two planes. Therefore, the mathematical analysis of the small crank is conducted in a single plane (static balancing). This is a parallel X, Y plane located through the pinion shaft counterweight lumped mass 520. The lumped mass of the pinion shaft double speed bearing journal and pinion shaft itself are neglected for the present because they lie on the line of rotation. Three kinematic position relationships can be developed for the pinion shaft's 506, counterweight and strap lumped mass points 518 and 520 and the point of work performing means force interaction 504. These three relationships uniquely define the independent variables (crank angle 526) relationship with the dependent variables (the position of points with respect to main shaft or crank). One further kinematic position relationship is required. The looper means rotational relationship with respect to the independent variable is needed to fully define this subsystem. The angle 528 defines the amount of this rotation. The angle 544 defines the angular relationship between the pinion shaft 506 and the local coordinate system. This relationship is fixed by the constrainst of the pinion gear 546 and ring gear 524 engagement.

The first derivative of these four relationships will produce the velocity of the points of concern. The second derivative will produce the accelerations of these points. The utilization of Newton's second law of kinetics will determine both the magnitude and the direction of the unresolved inertia forces acting in this particular X, Y plane of the pinion shaft 506. As is appreciated all of the masses and geometric relationships being developed are set up in general form allowing changes to be made to any variable with the purpose of optimizing the system. When the summation of the inertial forces remains constant and the summation of moment about the pinion shafts axis of rotation equal zero for 360° of rotation of the main shaft, the pinion shaft 506 may be considered statically balanced in the X, Y plane with the double speed bearing means supporting same being subject to a constant load. That is the pinion shaft 506 is considered balanced around its major axis. It will be noted that when the moment about the pinion shaft 506 equals zero, the constant resultant vector force radially rotates around the main shaft at the main shafts angular velocity. This fact allows balancing of this inertia force on the main shaft 508 by adjusting the main crank counter balance mass 530 180° out of phase thereby subjecting the main bearing set to but a minimum load and moment.

The main shaft 508 inertia force analysis is done in two planes (static and dynamic balancing). The main shaft and related elements are represented by three lumped masses 530, 532 and 534, and three points of force interaction the main bearing 514, and the two double speed bearing means 536 and 538. The first step in resolving the inertia forces of the main shaft is to transfer all of the pinion shaft 506 resultant forces to the double speed bearing points of force interaction 536 and 538. These forces will act on the main shaft 508 in equal magnitudes but in opposite directions. When all the forces and moments (transferred and inertial) acting on the main shaft 508 at the center 512 of the main bearing 514 in two planes is equal to zero, the main shaft can be considered balanced both statically and dynamically. Since the transferred and inertia forces acting on the main shaft 508 remain constant through an operating cycle the main shaft needs to be balanced at only one position. The main shaft counterweight mass 530 may be adjusted independently in the two balancing planes. These two planes are the X-Y and the Y-Z planes, which both pass through the center of the main bearing. For clarification, reference should be made to the orthographic plane representation 540 shown in FIG. 17. It should be noted that the point 542 projects into the plane of the page.

Several important aspects have arisen as a result of this analysis. First it will be noted that the mass of a counterweight for example 520, can be reduced and positioned further from the axis of rotation and still retain its inertial equilibrium. This fact can be used on the pinion shaft 506 to reduce the constant resulting inertial forces to a lower magnitude whereby minimizing the load at the double speed bearings. The result is a longer double speed bearing life and lower stress in the related parts. Secondly, from this analysis it is apparent that it is not necessary to balance the pinion shaft in two planes, rather, only static balancing is required. The resulting state of balance at the main shaft 508 is the same, regardless of whether or not the pinion shaft 506 is dynamically balanced.

The above analysis can be applied to at least four different work performing means and their related output path. Each of these various paths or motions presents their own particular relationships and problems. But, it must be noted that straight line motion can be considered separate from the elliptical, helical, and helical/elliptical motion. For example, with straight line motion or output of the work performing means, the balancing analysis is straightforward. Theoretically, the Cardan gear means which drives a work performing means along a straight line path can be totally balanced with the proper selection of the pinion shaft and main shaft counterweights. However, allowing for manufacturing tolerances, etc., it is appreciated that theoretical can never be absolutely achieved but rather only approached. The balancing of the elliptical, helical and helical/output motions proceeds in the same manner as that for straight line motion. However, as previously explained not only must the work performing means be reciprocated along the major axis of the looper bar 500 but it also must be rotated therearound (the angle 528 shown in FIG. 17). This gives rise to a rotational inertia torque which acts about the main axis of the looper bar means. Balancing in the conventional way will not resolve this torque. As the angle of rotation of the looper bar means increases so does the magnitude of the inertia torque.

It has been found that by adjusting the pinion shaft counterweight mass 520 the inertial imbalance can be reduced or eliminated. For example, if the work performing means is being driven through an elliptical output motion it is possible to approach a totally balanced system. With both the helical and helical/elliptical output motions a larger work performing means rotational angle is required. In this case adjustment to the pinion shaft counterweight mass is used to reduce the magnitude of force fluctuations and moment reversals on the small pinion to a minimum. Total balance of these two output motions cannot be brought to approach theoretical but can be brought to an acceptable level whereby the total Cardan gear mechanism can perform in an acceptable manner. In these two modes of output motion, gear reversal on the pinion shaft can be eliminated, allowing control of pinion gear impacts. As is appreciated, when the pinion shaft counterweight is treated in this manner, the pinion shaft will appear to be unbalanced when an attempt is made to balance it about its major axis. However, when assembled within the total Cardan gear means the entire assemblage when balanced around the main bearing such as 514 will be optimumly balanced.

The utility of this invention is more fully explained in other copending U.S. patent applications. For example, application Ser. No. 478,599 filed Mar. 24, 1983 discloses a balanced Cardan gear module; application Ser. No. 904,206 filed May 9, 1978, now U.S. Pat. No. 4,374,502 discloses output which is along a helical path; application Ser. No. 904,207 filed May 9, 1978, now U.S. Pat. No. 4,362,113 discloses a device which generates output along a helical/elliptical like path; application Ser. No. 386,366 filed June 8, 1982 discloses a force transfer means which links the Cardan gear module to the output device; and application Ser. No. 904,205, filed May 9, 1978 discloses a modularized sewing machine incorporating a series of Cardan gear module output devices.

While a preferred embodiment of the invention has been described and shown in some detail it will be understood that various changes may be made in the construction and arrangement of parts without departing from the invention as defined by the appended claims.

What is claimed:

1. A Cardan gear assembly wherein rotary motion of the input shaft results in the elliptical like output of a work performing instrumentality, said Cardan gear assembly including a pinion output lever, main bearing means subjected to generally minimum load and moment and a double speed bearing means subjected to a constant load during operation wherein the improvement comprises:
   means operative to convert elliptical two dimensional motion into elliptical like three dimensional motion, connected to the pinion output lever of said Cardan gear assembly means;
   a means supporting said work performing instrumentality and being connected to said means operative to convert elliptical two dimensional motion into elliptical like three dimensional motion; and
   a bearing means carrying said means supporting said work performing instrumentality such that rotary and reciprocatory motion occur therebetween.

2. The Cardan gear assembly of claim 1 wherein:
   the work performing instrumentality has a leading working section means which is spaced away from the major axis of reciprocation of said means supporting said work performing instrumentality such that it sweeps out an ellipse like path.

3. The Cardan gear assembly of claim 2 wherein said work performing instrumentality is a looper means and said means supporting said work performing instrumentality is a looper bar.

4. The Cardan gear assembly of claim 1 wherein portions of said means operative to convert elliptical two dimensional motion into elliptical like three dimensional motion sweeps out an ellipse in a first plane, and said work performing instrumentality has a leading working section means which sweeps out an ellipse like curve in three dimensions.

5. The Cardan gear assembly of claim 1 wherein portions of said means operative to convert elliptical two dimensional motion into elliptical like three dimensional motion sweeps out a first curve which has a major axis which is a straight line in a first plane and said work performing instrumentality includes a supporting means and sweeps out a second curve which has a major axis on a second straight line in a second plane, said first and second straight lines being parallel and spaced apart.

6. The Cardan gear assembly of claim 1 wherein said means operative to convert elliptical two dimensional motion into elliptical like three dimensional motion has an output center means and said Cardan gear assembly means includes a ring gear means, said output center means being outside of the pitch diameter of said ring gear means.

7. A method for converting rotary motion into elliptical like motion comprising the steps of:

balancing a Cardan gear means;

converting the elliptical two dimensional output of said Cardan gear means into reciprocatory and rotary motion;

transferring said reciprocatory and rotary motion to a shaft means whereby said shaft moves along and around its major axis; and connecting a lever means to said shaft having a work performing means spaced away from said shaft whereby said work performing means sweeps out generally an ellipse like curve in three dimensions.

* * * * *

UNITED STATES PATENT AND TRADEMARK OFFICE
CERTIFICATE OF CORRECTION

PATENT NO. : 4,513,674

DATED : April 30, 1985

INVENTOR(S) : Chandrakant Bhatia, et al.

It is certified that error appears in the above-identified patent and that said Letters Patent is hereby corrected as shown below:

The term of this patent subsequent to August 17, 1999, has been disclaimed.

Signed and Sealed this

Twenty-sixth Day of January, 1988

Attest:

DONALD J. QUIGG

Attesting Officer      Commissioner of Patents and Trademarks